United States Patent
Muszumanski

[11] 4,118,108
[45] Oct. 3, 1978

[54] ZOOM OBJECTIVE, ESPECIALLY FOR A PROJECTOR

[75] Inventor: Trude Muszumanski, Vienna, Austria

[73] Assignees: Karl Vockenhuber; Raimund Hauser, both of Vienna, Austria

[21] Appl. No.: 713,221

[22] Filed: Aug. 10, 1976

[30] Foreign Application Priority Data

Aug. 11, 1975 [AT] Austria .................................. 6228/75

[51] Int. Cl.² ............................................. G02B 15/14
[52] U.S. Cl. .................................................. 350/184
[58] Field of Search ........................ 350/184, 186, 223

[56] References Cited

U.S. PATENT DOCUMENTS 3,532,414 10/1970 Higuchi et al. ...................... 350/223
3,915,547 10/1975 Scidmore .............................. 350/223
3,927,931 12/1975 Muszumanski ....................... 350/186

*Primary Examiner*—Conrad J. Clark
*Attorney, Agent, or Firm*—Montague & Ross

[57] ABSTRACT

A zoom objective with a varifocal ratio close to 2:1, particularly for a projector, has a stationary positive front component, a single axially shiftable negative lens and a stationary multilens rear component. An object-side positive lens member of the rear component, adjoining the shiftable negative lens, has a focal length smaller than that of the group constituted by the remaining, image-side lens members of this component. The negatively refracting third member of the rear component may be a doublet with a positively refracting cemented surface, convex toward the image side, or an equivalent lens pair separated by a small air gap.

9 Claims, 6 Drawing Figures

ZOOM OBJECTIVE, ESPECIALLY FOR A PROJECTOR

FIELD OF THE INVENTION

My present invention relates to an optical system of the pancratic type, more often referred to as a varifocal or zoom objective, and in particular to a projection objective of variable magnification ratio.

BACKGROUND OF THE INVENTION

It is known, e.g. from Austrian Pat. No. 290,162 and German utility model No. 1,814,231, to design such objectives with two stationary components and one movable component, i.e. an axially fixed positively refracting front component, an axially shiftable negatively refracting intermediate component and an axially fixed positively refracting rear component or basic objective. These prior-art constructions, with the shiftable component represented by a single biconcave lens, have yielded varifocal ratios of not more than about 1.7:1.

OBJECTS OF THE INVENTION

An object of my present invention is to provide an improved zoom objective of this character whose varifocal ratio approaches the value of 2:1.

A related object is to achieve this increased varifocal ratio in an improved optical system corrected for residual off-axial aberrations and other distortions over the entire image area, throughout the varifocal range, with a relative aperture of preferably not less than 1:1.3.

SUMMARY OF THE INVENTION

I realize these aims, in accordance with my present invention, by constituting the positive rear component as a combination of a first positive lens on the object side and a positively refracting multilens group on the image side including a second positive lens, a third positive lens and a negative lens member therebetween, this component differing from conventional four-lens basic objectives by the fact that the individual focal length of the first positive lens is smaller than that of the associated multilens group.

Such a dimensioning results in an increased power of the first positive lens which collects the light rays diverging behind the shiftable component in such a manner that these rays impinge relatively close to the axis upon the subsequent lenses. Thus, the power of the negative lens member of the multilens group can be considerably lower than in conventional objectives of similar relative aperture, with resultant flattening of astigmatic image curvature.

BRIEF DESCRIPTION OF THE DRAWING

The above and other features of my invention will now be described in detail with reference to the accompanying drawing in which.

SPECIFIC DESCRIPTION

Figure 1:
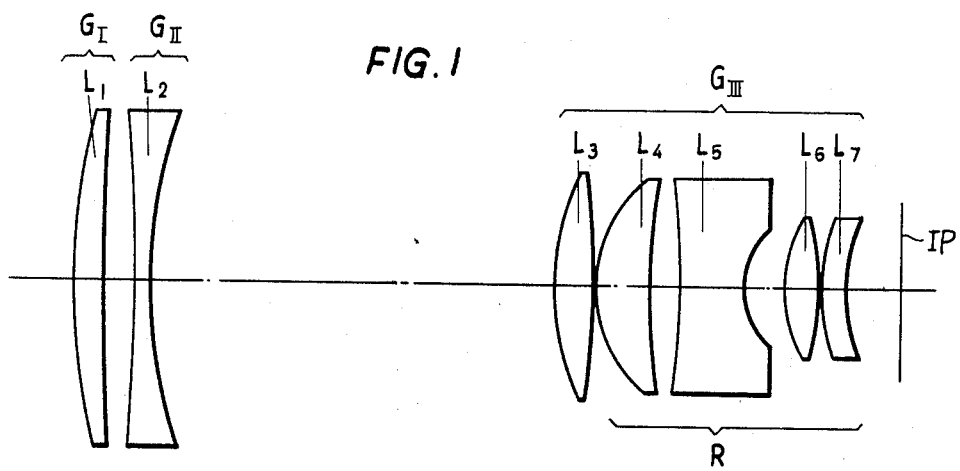
FIGS. 1, 2 and 3 show a varifocal objective according to the invention in three different positions.
Figure 2:
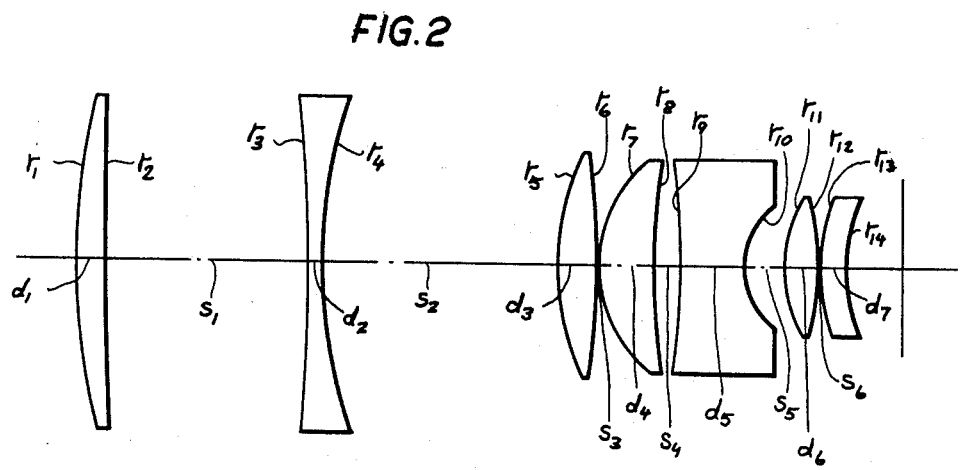
Figure 3:
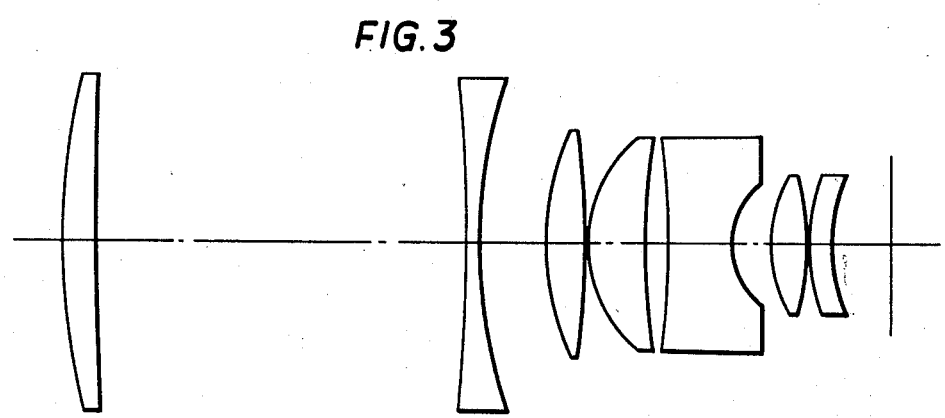

The varifocal or zoom objective shown in FIGS. 1-3 comprises a positive front component $G_I$ in the shape of a nearly planoconvex positive meniscus $L_1$, a negative intermediate component $G_{II}$ represented by a biconcave lens $L_2$, and a rear component $G_{III}$ consisting of a first positive lens $L_3$ followed by a multilens group R which is composed of a second positive a second positive lens $L_4$, a negative lens $L_5$, a further positive lens $L_6$ and a weakly refractive negative lens $L_7$.

Front lens $L_1$, which is considered stationary except for a possible axial adjustability for focusing purposes, has radii $r_1$, $r_2$ and an axial thickness $d_1$. Lens $L_2$, which is separated from lenses $L_1$ and $L_3$ by two variable air spaces $s_1$ and $s_2$, has radii $r_3$, $r_4$ and a thickness $d_2$. Lenses $L_3$ and $L_6$ are biconvex, lenses $L_4$ and $L_7$ are positive and negative menisci, respectively and lens $L_5$ is biconcave; their radii, thicknesses and separations have been designated $r_5$–$r_{14}$, $d_3$–$d_7$ and $s_3$–$s_6$. The system has an image plane IP which remains substantially fixed throughout the axial displacement of component $G_{II}$ between a position of minimum focal length $f_{min}$ (FIG. 1), a position of intermediate focal length $f_{med}$ (FIG. 2) and a position of maximum focal length $f_{max}$ (FIG. 3).

According to an important feature of my invention, the first lens $L_3$ of rear component $G_{III}$ has an individual focal length $f_3$ which is smaller than the focal length $f_R$ of the lens group R constituting the remainder of this component. This will become apparent from the representative numerical values given hereinafter for several embodiments.

Figure 4:
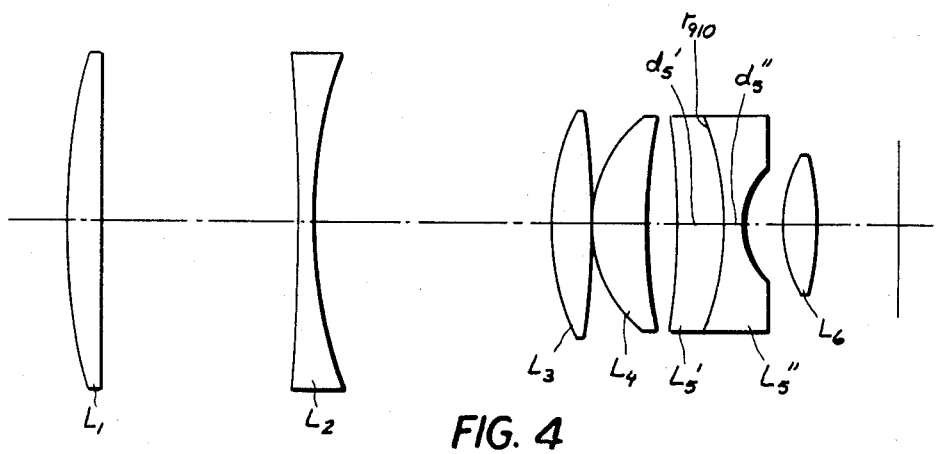
FIG. 4 is a view similar to FIG. 2, showing another embodiment.

The final image-side lens $L_7$, which is only weakly refractive, serves in a manner known per se for a supplemental flattening of the image but may be omitted if desired. An additional flattening effect can also be realized, as illustrated in FIG. 4, by replacing the biconcave singlet $L_5$ of FIGS. 1-3 with a doublet consisting of two lenses $L_5'$, $L_5''$ cemented together along a surface of radius $r_{910}$ which is positively refracting and convex toward the image side, the refractive index of lens $L_5'$ being greater than that of lens $L_5''$. The collective effect of this cemented surface allows a reduction in the other positive lenses of the basic objective $G_{III}$ and yields a Petzval surface whose radius is a multiple of the minimum overall focal length $f_{min}$.

Figure 4A:
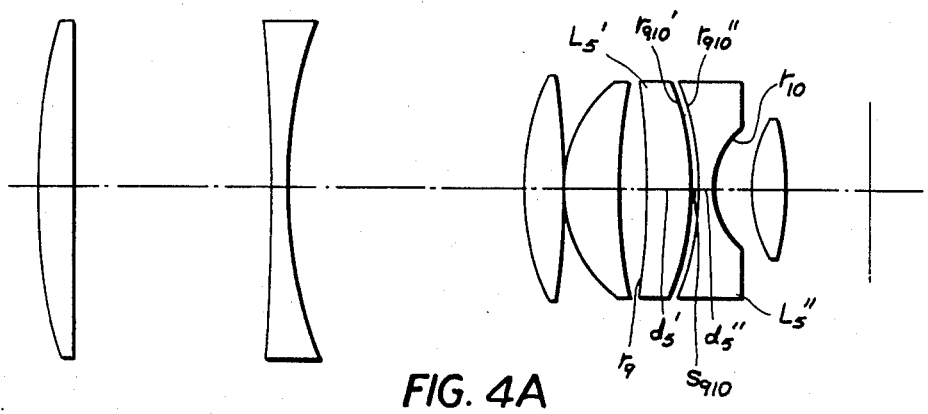
FIG. 4A is a view like FIG. 4 but illustrating a modification.

As shown in FIG. 4A, the lenses $L_5'$ and $L_5''$ of axial thickness $d_5'$, $d_5''$ may be separated by a small air gap of width $s_{910}$ between surfaces of identical radii of curvature $r_{910}'$ and $r_{910}''$.

The system of FIG. 4 or FIG. 4A could also be supplemented by a flattening lens $L_7$ as shown in FIGS. 1-3.

The front component $G_I$ in any of the aforedescribed systems may also be split into two lenses which are either cemented together or separated by a small air gap. The latter arrangement has been illustrated in FIG. 5 where a negative meniscus $L_1'$ and a nearly planoconvex lens $L_1''$ are closely juxtaposed with confronting surfaces of identical radii $r_0'$ and $r_0''$, the width of the gap having been designated $s_0$.

Figure 5:
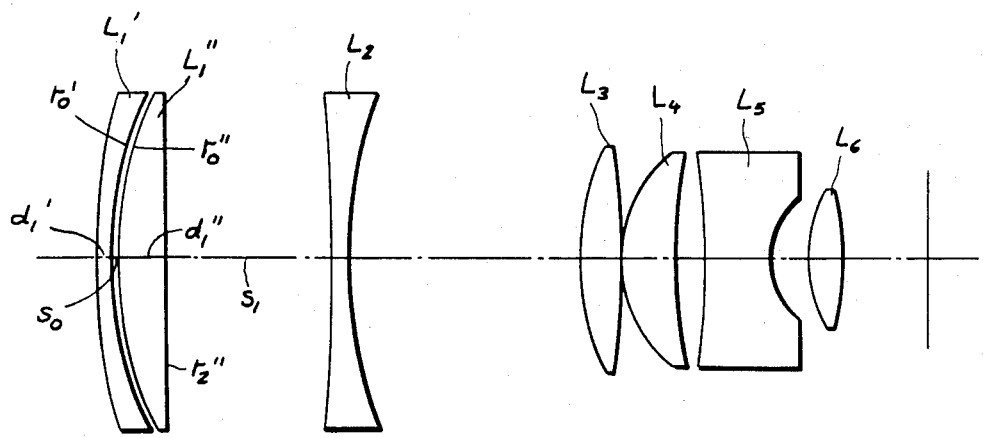
FIG. 5 is another view similar to FIG. 2, representing a further embodiment.

The front component $G_I$, or at least one of its constituents such as the second lens $L_1''$ of FIG. 5, may have a refractive index low enough (i.e. of about 1.5) to allow its manufacture from synthetic resin rather than glass, e.g. a polyacrylate known as Plexiglass N7. This entails a considerable saving in cost, on account of the large diameter of that lens member.

In the following Tables A to F I have listed representative numerical values for the radii of curvature, axial thicknesses and separations for the several lenses of each of the embodiments shown in the drawing, based upon a value of unity for the focal length $f_{min}$ in all instances (without lens $L_7$). The Tables also include the refractive indices $n_d$ and the Abbe' numbers $v_d$ of these lenses, as well as the individual focal lengths $f_3$ of lens $L_3$ and $f_R$ of lens group R.

TABLE A
(FIGS. 1 - 3)

| | | | $n_d$ | $v_d$ | |
|---|---|---|---|---|---|
| $L_1$ | $r_1 = +3.366$ | $d_1 = 0.190$ | 1.504 | 66.9 | |
| | $r_2 = +25.552$ | $s_1 = \begin{cases} 0.133\, f_{min} \\ 1.967\, f_{max} \end{cases}$ | | | |
| $L_2$ | $r_3 = -10.498$ | $d_2 = 0.089$ | 1.651 | 55.9 | |
| | $r_4 = +2.393$ | $s_2 = \begin{cases} 2.182\, f_{min} \\ 0.348\, f_{max} \end{cases}$ | | | |
| $L_3$ | $r_5 = 30\,1.445$ | $d_3 = 0.215$ | 1.603 | 60.6 | $f_3 = +1.831$ |
| | $r_6 = -4.427$ | $s_3 = 0.006$ | | | |
| $L_4$ | $r_7 = +0.712$ | $d_4 = 0.307$ | 1.603 | 60.6 | |
| | $r_8 = +3.565$ | $s_4 = 0.114$ | | | |
| $L_5$ | $r_9 = -5.063$ | $d_5 = 0.393$ | 1.847 | 23.8 | $f_R = +1.971$ |
| | $r_{10} = +0.396$ | $s_5 = 0.185$ | | | |
| $L_6$ | $r_{11} = +0.689$ | $d_6 = 0.209$ | 1.784 | 43.9 | |
| | $r_{12} = -1.505$ | | | | |
| | | $f_{min} = 1.000$ | | | |
| | | $f_{max} = 1.823$ | | | |
| relative aperture | | 1 : 1.3 | | | |
| image diagonal | | 0.424 | | | |

TABLE B
(FIGS. 1 - 3)

| | | | $n_d$ | $v_d$ | |
|---|---|---|---|---|---|
| $L_1$ | $r_1 = +3.240$ | $d_1 = 0.193$ | 1.504 | 66.9 | |
| | $r_2 = +18.049$ | $s_1 = \begin{cases} 0.135\, f_{min} \\ 2.001\, f_r \end{cases}$ | | | |
| $L_2$ | $r_3 = -12.185$ | $d_2 = 0.090$ | 1.651 | 55.9 | |
| | $r_4 = +2.366$ | $s_2 = \begin{cases} 2.220\, f_{min} \\ 0.354\, f_{max} \end{cases}$ | | | |
| $L_3$ | $r_5 = +1.388$ | $d_3 = 0.219$ | 1.603 | 60.6 | $f_3 = +1.922$ |
| | $r_6 = -6.610$ | $s_3 = 0.006$ | | | |
| $L_4$ | $r_7 = +0.762$ | $d_4 = 0.312$ | 1.641 | 60.1 | |
| | $r_8 = +3.662$ | $s_4 = 0.116$ | | | |
| $L_5$ | $r_9 = -4.999$ | $d_5 = 0.380$ | 1.805 | 25.4 | $f_R = +1.982$ |
| | $r_{10} = +0.413$ | $s_5 = 0.180$ | | | |
| $L_6$ | $r_{11} = +0.724$ | $d_6 = 0.193$ | 1.788 | 47.4 | |
| | $r_{12} = -1.670$ | | | | |
| | | $f_{min} = 1.000$ | | | |
| | | $f_{max} = 1.824$ | | | |
| relative aperture | | 1 : 1.3 | | | |
| image diagonal | | 0.431 | | | |

Following are the additional parameters for an expanded system of this type including the lens $L_7$.

TABLE B'

| | | | $n_d$ | $v_d$ |
|---|---|---|---|---|
| $L_7$ | $r_{13} = +1.094$ | $s_6 = 0.006$ | | |
| | $r_{14} = +0.826$ | $d_7 = 0.148$ | 1.603 | 60.6 |
| | | $f_{min} = 0.992$ | | |
| | | $f_{max} = 1.813$ | | |
| relative aperture | | 1 : 1.3 | | |
| image diagonal | | 0.431 | | |

The relative aperture and the image diagonal remain unchanged by the inclusion of this additional lens.

The lens $L_1$ of Table A can readily be replaced by one of still lower refractive index manufactured, if desired, from transparent plastic as discussed above. Such a lens would have the following parameters:

TABLE A'

| | | | $n_d$ | $v_d$ |
|---|---|---|---|---|
| $L_1$ | $r_1 = +3.366$ | $d_1 = 0.190$ | 1.501 | 56.4 |
| | $r_2 = +25.552$ | | | |
| | | $f_{min} = 0.997$ | | |
| | | $f_{max} = 1.820$ | | |

This modified objective has the same relative aperture and image diagonal as that of Table A.

TABLE C
(FIGS. 1-3)

| | | | $n_d$ | $v_d$ | |
|---|---|---|---|---|---|
| $L_1$ | $r_1 = +3.471$ | $d_1 = 0.190$ | 1.504 | 66.9 | |
| | $r_2 = +33.682$ | $s_1 = \begin{cases} 0.133\, f_{min} \\ 1.967\, f_{max} \end{cases}$ | | | |
| $L_2$ | $r_3 = -11.967$ | $d_2 = 0.088$ | 1.651 | 55.9 | |
| | $r_4 = +2.324$ | $s_2 = \begin{cases} 2.180\, f_{min} \\ 0.348\, f_{max} \end{cases}$ | | | |
| $L_3$ | $r_5 = +1.444$ | $d_3 = 0.215$ | 1.603 | 60.6 | $f_3 = +1.830$ |
| | $r_6 = -4.425$ | $s_3 = 0.006$ | | | |
| $L_4$ | $r_7 = +0.711$ | $d_4 = 0.307$ | 1.603 | 60.6 | |
| | $r_8 = +3.563$ | $s_4 = 0.114$ | | | |
| $L_5$ | $r_9 = -4.910$ | $d_5 = 0.373$ | 1.805 | 25.4 | $f_R = +2.002$ |
| | $r_{10} = +0.394$ | $s_5 = 0.190$ | | | |
| $L_6$ | $r_{11} = +0.696$ | $d_6 = 0.209$ | 1.744 | 44.8 | |
| | $r_{12} = -1.444$ | | | | |
| | | $f_{min} = 1.000$ | | | |
| | | $f_{max} = 1.824$ | | | |
| relative aperture | | 1 : 1.3 | | | |
| image diagonal | | 0.423 | | | |

TABLE C'

| | | | $n_d$ | $v_d$ |
|---|---|---|---|---|
| | | $s_6 = 0.006$ | | |
| $L_7$ | $r_{13} = +1.074$ | $d_7 = 0.126$ | 1.603 | 60.6 |
| | $r_{14} = +0.920$ | | | |
| | | $f_{min} = 0.974$ | | |
| | | $f_{max} = 1.779$ | | |
| relative aperture | | 1 : 1.3 | | |
| image diagonal | | 0.423 | | |

TABLE D
(FIG. 4)

| | | | $n_d$ | $v_d$ |
|---|---|---|---|---|
| $L_1$ | $r_1 = +3.249$ | $d_1 = 0.194$ | 1.504 | 66.9 |
| | $r_2 = +18.098$ | $s_1 = \begin{cases} 0.136\, f_{min} \\ 2.007\, f_{max} \end{cases}$ | | |
| $L_2$ | $r_3 = -9.679$ | $d_2 = 0.090$ | 1.652 | 44.9 |
| | $r_4 = +2.501$ | $s_2 = \begin{cases} 2.226\, f_{min} \\ \end{cases}$ | | |

TABLE D-continued
(FIG. 4)

|  |  |  | $n_d$ | $\nu_d$ |  |
|---|---|---|---|---|---|
|  |  | 0.355 $f_{max}$ |  |  |  |
| $L_3$ | $r_5 = +1.392$<br>$r_6 = -6.628$ | $d_3 = 0.219$ | 1.603 | 60.6 | $f_3 = +1.927$ |
|  |  | $s_3 = 0.006$ |  |  |  |
| $L_4$ | $r_7 = +0.775$<br>$r_8 = +3.993$ | $d_4 = 0.313$ | 1.641 | 60.1 |  |
|  |  | $s_4 = 0.116$ |  |  |  |
| $L_5'$ | $r_9 = -3.249$<br>$r_{910}' = -0.522$ | $d_5 = 0.316$ | 1.805 | 25.4 |  |
| $L_5''$ |  | $d_6 = 0.064$ | 1.762 | 26.5 | $f_R = +2.022$ |
|  | $r_{10} = +0.411$ |  |  |  |  |
| $L_6$ | $r_{11} = +0.685$<br>$r_{12} = -2.267$ | $d_6 = 0.194$ | 1.788 | 47.4 |  |
|  |  | $f_{min} = 1.000$<br>$f_{max} = 1.826$ |  |  |  |
| relative aperture |  | 1 : 1.3 |  |  |  |
| image diagonal |  | 0.432 |  |  |  |

TABLE E
(FIG. 4A)

|  |  |  | $n_d$ | $\nu_d$ |  |
|---|---|---|---|---|---|
| $L_1$ | $r_1 = +3.744$<br>$r_2 = +66.833$ | $d_1 = 0.191$ | 1.504 | 66.9 |  |
|  |  | $s_1 = \begin{cases} 0.136\ f_{min} \\ 2.009\ f_{max} \end{cases}$ |  |  |  |
| $L_2$ | $r_3 = -6.041$<br>$r_4 = +2.966$ | $d_2 = 0.090$ | 1.651 | 55.9 |  |
|  |  | $s_2 = \begin{cases} 2.229\ f_{min} \\ 0.355\ f_{max} \end{cases}$ |  |  |  |
| $L_3$ | $r_5 = +1.393$<br>$r_6 = -6.636$ | $d_3 = 0.220$ | 1.603 | 60.6 | $f_3 = +1.929$ |
|  |  | $s_3 = 0.006$ |  |  |  |
| $L_4$ | $r_7 = +0.765$<br>$r_8 = +4.015$ | $d_4 = 0.313$ | 1.641 | 60.1 |  |
|  |  | $s_4 = 0.116$ |  |  |  |
| $L_5'$ | $r_9 = -3.253$<br>$r_{910}' = -1.012$ | $d_5 = 0.317$ | 1.805 | 25.4 |  |
|  |  | $s_{910} = 0.006$ |  |  | $f_R = +2.098$ |
| $L_5''$ | $r_{910}'' = -1.012$<br>$r_{10} = +0.415$ | $d_6 = 0.064$ | 1.762 | 26.5 |  |
|  |  | $s_5 = 0.181$ |  |  |  |
| $L_6$ | $r_{11} = +0.675$<br>$r_{12} = -2.559$ | $d_6 = 0.194$ | 1.788 | 47.4 |  |
|  |  | $f_{min} = 1.000$<br>$f_{max} = 1.826$ |  |  |  |
| relative aperture |  | 1 : 1.3 |  |  |  |
| image diagonal |  | 0.433 |  |  |  |

TABLE F
(FIG. 5)

|  |  |  | $n_d$ | $\nu_d$ |  |
|---|---|---|---|---|---|
| $L_1'$ | $r_1 = +3.314$<br>$r_0' = +2.103$ | $d_1' = 0.096$ | 1.689 | 31.2 |  |
|  |  | $s_0 = 0.032$ |  |  |  |
| $L_1''$ | $r_0'' = +2.103$<br>$r_2 = -40.814$ | $d_1'' = 0.225$ | 1.501 | 56.4 |  |
|  |  | $s_1 = \begin{cases} 0.124\ f_{min} \\ 1.989\ f_{max} \end{cases}$ |  |  |  |
| $L_2$ | $r_3 = -12.671$<br>$r_4 = +2.348$ | $d_2 = 0.090$ | 1.651 | 55.9 |  |
|  |  | $s_2 = \begin{cases} 2.219\ f_{min} \\ 0.354\ f_{max} \end{cases}$ |  |  |  |
| $L_3$ | $r_5 = +1.387$<br>$r_6 = -6.608$ | $d_3 = 219$ | 1.603 | 60.6 | $f_4 = +1.921$ |
|  |  | $s_3 = 0.006$ |  |  |  |
| $L_4$ | $r_7 = +756$<br>$r_8 = +3.491$ | $d_4 = 0.312$ | 1.641 | 60.1 |  |

TABLE F-continued
(FIG. 5)

|  |  |  | $n_d$ | $\nu_d$ |  |
|---|---|---|---|---|---|
|  |  | $s_4 = 0.116$ |  |  |  |
| $L_5$ | $r_9 = -4.998$<br>$r_{10} = +0.405$ | $d_5 = 0.380$ | 1.805 | 25.4 | $f_R = +1.968$ |
|  |  | $s_5 = 0.167$ |  |  |  |
| $L_6$ | $r_{11} = +0.714$<br>$r_{12} = -1.566$ | $d_6 = 0.193$ | 1.788 | 47.4 |  |
|  |  | $f_{min} = 1.000$<br>$f_{max} = 1.831$ |  |  |  |
| relative aperture |  | 1 : 1.3 |  |  |  |
| image diagonal |  | 0.431 |  |  |  |

From the foregoing values it will be noted that the focal length $f_3$ of lens $L_3$ is not only less than the focal length $f_R$ of the associated group R (with or without the additional flattening lens $L_7$) but also less than the absolute values of the individual focal lengths of the preceding components $G_I$ and $G_{II}$.

I claim:

1. A varifocal objective consisting of an axially fixed positively refracting front component, an axially shiftable negatively refracting intermediate component, and an axially fixed positively refracting rear component constituted by an object-side first positive lens and an image-side positively refracting multilens group; said multilens group comprising a second positive lens, a third positive lens, and a negative lens between said second and third positive lenses; said front component $L_1$, said intermediate component $L_2$, said first positive lens $L_3$, said second positive lens $L_4$, said negative lens $L_5$ and said third positive lens $L_6$ having radii of curvature $r_1$-$r_{12}$, axial thicknesses $d_1$-$d_6$, separations $s_1$-$s_5$, refractive indices $n_d$ and Abbe' numbers $\nu_d$ substantially as given in the following table:

|  |  |  |  | $n_d$ | $\nu_d$ |
|---|---|---|---|---|---|
| $L_1$ | $r_1 = +3.24$<br>$r_2 = +18.05$ |  | $d_1 = 0.19$ | 1.50 | 67 |
|  |  | $s_1 = \begin{cases} 0.14\ f_{min} \\ 2.00\ f_{max} \end{cases}$ |  |  |  |
| $L_2$ | $r_3 = -12.19$<br>$r_4 = +2.37$ |  | $d_2 = 0.09$ | 1.65 | 56 |
|  |  | $s_2 = \begin{cases} 2.22\ f_{min} \\ 0.35\ f_{max} \end{cases}$ |  |  |  |
| $L_3$ | $r_5 = +1.39$<br>$r_6 = -6.61$ |  | $d_3 = 0.22$ | 1.60 | 61 |
|  |  | $s_3 = 0.01$ |  |  |  |
| $L_4$ | $r_7 = +0.76$<br>$r_8 = +3.66$ |  | $d_4 = 0.31$ | 1.64 | 60 |
|  |  | $s_4 = 0.12$ |  |  |  |
| $L_5$ | $r_9 = -5.00$<br>$r_{10} = +0.41$ |  | $d_5 = 0.38$ | 1.81 | 25 |
|  |  | $s_5 = 0.18$ |  |  |  |
| $L_6$ | $r_{11} = +0.72$<br>$r_{12} = -1.67$ |  | $d_6 = 0.19$ | 1.79 | 47 |

2. A varifocal objective consisting of an axially fixed positively refracting front component, an axially shiftable negatively refracting intermediate component, and an axially fixed positively refracting rear component constituted by an object-side first positive lens and an image-side positively refracting multilens group; said multilens group comprising a second positive lens, a third positive lens, and a negative lens between said second and third positive lenses; said front component $L_1$, said intermediate component $L_2$, said first positive lens $L_3$, said second positive lens $L_4$, said negative lens $L_5$ and said third positive lens $L_6$ having radii of curvature $r_1-r_{12}$, axial thicknesses $d_1-d_6$, separations $s_1-s_5$, refractive indices $n_d$ and Abbé numbers $v_d$ substantially as given in the following table:

| | | | $n_d$ | $v_d$ |
|---|---|---|---|---|
| $L_1$ | $r_1 = +3.37$ $r_2 = +25.55$ | $d_1 = 0.19$ $s_1 = \begin{cases} 0.13\ f_{min} \\ 1.97\ f_{max} \end{cases}$ | 1.50 | 67 |
| $L_2$ | $r_3 = -10.50$ $r_4 = +2.40$ | $d_2 = 0.09$ $s_2 = \begin{cases} 2.18\ f_{min} \\ 0.35\ f_{max} \end{cases}$ | 1.65 | 56 |
| $L_3$ | $r_5 = +1.45$ $r_6 = -4.43$ | $d_3 = 0.22$ $s_3 = 0.01$ | 1.60 | 61 |
| $L_4$ | $r_7 = +0.71$ $r_8 = +3.57$ | $d_4 = 0.31$ $s_4 = 0.11$ | 1.60 | 61 |
| $L_5$ | $r_9 = -5.06$ $r_{10} = +0.40$ | $d_5 = 0.39$ $s_5 = 0.190$ | 1.85 | 24 |
| $L_6$ | $r_{11} = +0.69$ $r_{12} = -1.51$ | $d_6 = 0.21$ | 1.78 | 44 |

3. A varifocal objective consisting of an axially fixed positively refracting front component, an axially shiftable negatively refracting intermediate component, and an axially fixed positively refracting rear component constituted by an object-side first positive lens and an image-side positively refracting multilens group; said multilens group comprising a second positive lens, a third positive lens, and a negative lens between said second and third positive lenses; said front component $L_1$, said intermediate component $L_2$, said first positive lens $L_3$, said second positive lens $L_4$, said negative lens $L_5$ and said third positive lens $L_6$ having radii of curvature $r_1-r_{12}$, axial thicknesses $d_1-d_6$, separations $s_1-s_5$, refractive indices $n_d$ and Abbé numbers $v_d$ substantially as given in the following table:

| | | | $n_d$ | $v_d$ |
|---|---|---|---|---|
| $L_1$ | $r_1 = +3.37$ $r_2 = +25.55$ | $d_1 = 0.19$ $s_1 = \begin{cases} 0.13\ f_{min} \\ 1.97\ f_{max} \end{cases}$ | 1.50 | 56 |
| $L_2$ | $r_3 = -10.50$ $r_4 = +2.40$ | $d_2 = 0.09$ $s_2 = \begin{cases} 2.18\ f_{min} \\ 0.35\ f_{max} \end{cases}$ | 1.65 | 56 |
| $L_3$ | $r_5 = +1.45$ $r_6 = -4.43$ | $d_3 = 0.21$ $s_3 = 0.01$ | 1.60 | 61 |
| $L_4$ | $r_7 = +0.71$ $r_8 = +3.57$ | $d_4 = 0.31$ $s_4 = 0.11$ | 1.60 | 61 |
| $L_5$ | $r_9 = -5.06$ $r_{10} = +0.40$ | $d_5 = 0.39$ $s_5 = 0.19$ | 1.85 | 24 |
| $L_6$ | $r_{11} = +0.69$ $r_{12} = -1.51$ | $d_6 = 0.21$ | 1.78 | 44 |

4. A varifocal objective as defined in claim 3 wherein said multilens group further comprises a further negative lens $L_7$ separated from said third positive lens $L_6$ by an air space $s_6$ and having radii $r_{13}$, $r_{14}$, an axial thickness $d_7$, a refractive index $n_d$ and an Abbé number $v_d$ substantially as given in the following table:

| | | | $n_d$ | $v_d$ |
|---|---|---|---|---|
| $L_7$ | $r_{13} = +1.10$ $r_{14} = +0.83$ | $s_6 = 0.01$ $d_7 = 0.15$ | 1.60 | 61 |

5. A varifocal objective consisting of an axially fixed positively refracting front component, an axially shiftable negatively refracting intermediate component, and an axially fixed positively refracting rear component constituted by an object-side first positive lens and an image-side positively refracting multilens group; said multilens group comprising a second positive lens, a third positive lens, and a negative lens between said second and third positive lenses; said front component $L_1$, said intermediate component $L_2$, said first positive lens $L_3$, said second positive lens $L_4$, said negative lens $L_5$ and said third positive lens $L_6$ having radii of curvature $r_1-r_{12}$, axial thicknesses $d_1-d_6$, separations $s_1-s_5$, refractive indices $n_d$ and Abbé numbers $v_d$ substantially as given in the following table:

| | | | $n_d$ | $v_d$ |
|---|---|---|---|---|
| $L_1$ | $r_1 = +3.47$ $r_2 = +33.68$ | $d_1 = 0.19$ $s_1 = \begin{cases} 0.13\ f_{min} \\ 1.97\ f_{max} \end{cases}$ | 1.50 | 67 |
| $L_2$ | $r_3 = -11.97$ $r_4 = +2.32$ | $d_2 = 0.09$ $s_2 = \begin{cases} 2.18\ f_{min} \\ 0.35\ f_{max} \end{cases}$ | 1.65 | 56 |
| $L_3$ | $r_5 = +1.44$ $r_6 = -4.43$ | $d_3 = 0.22$ $s_3 = 0.01$ | 1.60 | 61 |
| $L_4$ | $r_7 = +0.71$ $r_8 = +3.56$ | $d_4 = 0.31$ $s_4 = 0.11$ | 1.60 | 61 |
| $L_5$ | $r_9 = -4.91$ $r_{10} = +0.39$ | $d_5 = 0.37$ $s_5 = 0.19$ | 1.81 | 25 |
| $L_6$ | $r_{11} = +0.70$ $r_{12} = -1.44$ | $d_6 = 0.21$ | 1.74 | 45 |

6. A varifocal objective as defined in claim 5 wherein said multilens group further comprises a further negative lens $L_7$ separated from said third positive lens $L_6$ by an air space $s_6$ and having radii $r_{13}$, $r_{14}$, an axial thickness $d_7$, a refractive index $n_d$ and an Abbé number $v_d$ substantially as given in the following table:

| | | | $n_d$ | $v_d$ |
|---|---|---|---|---|
| $L_7$ | $r_{13} = +1.07$ $r_{14} = +0.92$ | $s_6 = 0.01$ $d_7 = 0.13$ | 1.60 | 61 |

7. A varifocal objective consisting of an axially fixed positively refracting front component consisting of two singlets, an axially shiftable negatively refracting intermediate component, and an axially fixed positively refracting rear component constituted by an object-side first positive lens and an image-side positively refracting multilens group; said multilens group comprising a second positive lens, a third positive lens, and a negative lens between said second and third positive lenses; the singlets $L_1'$, $L_1''$ of said front component, said intermediate component $L_2$, said first positive lens $L_3$, said second positive lens $L_4$, said negative $L_5$ and said third positive lens $L_6$ having radii of curvature $r_1$, $r_0'$, $r_0''$, $r_2$, $r_3$-$r_{12}$, axial thicknesses $d_1'$, $d_1''$, $d_2$-$d_6$, separations $s_0$-$s_5$, refractive indices $n_d$ and Abbé numbers $\nu_d$ substantially as given in the following table:

|  |  |  | $n_d$ | $\nu_d$ |
|---|---|---|---|---|
| $L_1'$ | $r_1 = +3.31$ <br> $r_0' = +2.10$ | $d_1' = 0.10$ | 1.69 | 31 |
|  |  | $s_0 = 0.03$ |  |  |
| $L_1''$ | $r_0'' = +2.10$ <br> $r_2 = -40.81$ | $d_1'' = 0.23$ | 1.50 | 56 |
|  |  | $s_1 = \begin{cases} 0.12\ f_{min} \\ 1.99\ f_{max} \end{cases}$ |  |  |
| $L_2$ | $r_3 = -12.67$ <br> $r_4 = +2.35$ | $d_2 = 0.09$ | 1.65 | 56 |
|  |  | $s_2 = \begin{cases} 2.22\ f_{min} \\ 0.35\ f_{max} \end{cases}$ |  |  |
| $L_2$ | $r_5 = +1.39$ <br> $r_6 = -6.61$ | $d_3 = 0.22$ | 1.60 | 61 |
|  |  | $s_3 = 0.01$ |  |  |
| $L_4$ | $r_7 = +0.76$ <br> $r_8 = +3.49$ | $d_4 = 0.31$ | 1.64 | 60 |
|  |  | $s_4 = 0.12$ |  |  |
| $L_5$ | $r_9 = -5.00$ <br> $r_{10} = -0.41$ | $d_5 = 0.38$ | 1.81 | 25 |
|  |  | $s_5 = 0.17$ |  |  |
| $L_6$ | $r_{11} = +0.71$ <br> $r_{12} = -1.57$ | $d_6 = 0.19$ | 1.79 | 47 |

8. A varifocal objective consisting of an axially fixed positively refracting front component, an axially shiftable negatively refracting intermediate component, and an axially fixed positively refracting rear component constituted by an object-side first positive lens and an image-side positively refracting multilens group; said multilens group comprising a second positive lens, a third positive lens, and a negative lens member consisting of two cemented lenses between said second and third positive lenses; said front component $L_1$, said intermediate component $L_2$, said first positive lens $L_3$, said second positive lens $L_4$, said cemented lenses $L_5'$, $L_5''$ and said third positive lens having radii of curvature $r_1$-$r_9$, $r_{910}$, $r_{10}$-$r_{12}$, axial thicknesses $d_1$-$d_4$, $d_5'$, $d_5''$, $d_6$, separations $s_1$-$s_5$, refractive indices $n_d$ and Abbé numbers $\nu_d$ substantially as given in the following table:

|  |  |  | $n_d$ | $\nu_d$ |
|---|---|---|---|---|
| $L_1$ | $r_1 = +3.25$ <br> $r_2 = +18.10$ | $d_1 = 0.19$ | 1.50 | 67 |
|  |  | $s_1 = \begin{cases} 0.14\ f_{min} \\ 2.01\ f_{max} \end{cases}$ |  |  |
| $L_2$ | $r_3 = -9.68$ | $d_2 = 0.09$ | 1.65 | 45 |
|  | $r_4 = +2.50$ |  |  |  |
|  |  | $s_2 = \begin{cases} 2.23\ f_{min} \\ 0.36\ f_{max} \end{cases}$ |  |  |
| $L_3$ | $r_5 = +1.39$ <br> $r_6 = -6.63$ | $d_3 = 0.22$ | 1.60 | 61 |
|  |  | $s_3 = 0.01$ |  |  |
| $L_4$ | $r_7 = +0.78$ <br> $r_8 = +3.99$ | $d_4 = 0.31$ | 1.64 | 60 |
|  |  | $s_4 = 0.12$ |  |  |
| $L_5'$ | $r_9 = -3.25$ <br> $r_{910} = -0.52$ | $d_5' = 0.32$ | 1.81 | 25 |
| $L_5''$ | $r_{10} = +0.41$ | $d_5'' = 0.06$ | 1.76 | 27 |
|  |  | $s_5 = 0.18$ |  |  |
| $L_6$ | $r_{11} = +0.69$ <br> $r_{12} = -2.27$ | $d_6 = 0.19$ | 1.79 | 47 |

9. A varifocal objective consisting of an axially fixed positively refracting front component, an axially shiftable negatively refracting intermediate component, and an axially fixed positively refracting rear component constituted by an object-side first positive lens and an image-side positively refracting multilens group; said multilens group comprising a second positive lens, a third positive lens and a negative lens member consisting of two closely juxtaposed lenses between said second and third positive lenses; said front component $L_1$, said intermediate component $L_2$, said first positive lens $L_3$, said second positive lens $L_4$, said juxtaposed lenses $L_5'$, $L_5''$ and said third positive lens having radii of curvature $r_1$-$r_9$, $r_{910}'$, $r_{910}''$, $r_{10}$-$r_{12}$, axial thicknesses $d_1$-$d_4$, $d_5'd_5''$, $d_6$, separations $s_1$-$s_4$, $s_{910}$, $s_{11}$, refractive indices $n_d$ and Abbé numbers $\nu_d$ substantially as given in the following table:

|  |  |  | $n_d$ | $\nu_d$ |
|---|---|---|---|---|
| $L_1$ | $r_1 = +3.74$ <br> $r_2 = +66.83$ | $d_1 = 0.19$ | 1.50 | 67 |
|  |  | $s_1 = \begin{cases} 0.14\ f_{min} \\ 2.01\ f_{max} \end{cases}$ |  |  |
| $L_2$ | $r_3 = -6.04$ <br> $r_4 = +2.97$ | $d_2 = 0.09$ | 1.65 | 56 |
|  |  | $s_2 = \begin{cases} 2.23\ f_{min} \\ 0.36\ f_{max} \end{cases}$ |  |  |
| $L_3$ | $r_5 = +1.39$ <br> $r_6 = -6.64$ | $d_3 = 0.22$ | 1.60 | 61 |
|  |  | $s_3 = 0.01$ |  |  |
| $L_4$ | $r_7 = +0.77$ <br> $r_8 = +4.02$ | $d_4 = 0.31$ | 1.64 | 60 |
|  |  | $s_4 = 0.12$ |  |  |
| $L_5'$ | $r_9 = -3.25$ <br> $r_{910}' = -1.01$ | $d_5' = 0.32$ | 1.81 | 25 |
|  |  | $s_{910} = 0.01$ |  |  |
| $L_5''$ | $r_{910}'' = -1.01$ <br> $r_{10} = +0.42$ | $d_5'' = 0.06$ | 1.76 | 27 |
|  |  | $s_5 = 0.18$ |  |  |
| $L_6$ | $r_{11} = +0.68$ <br> $r_{12} = -2.56$ | $d_6 = 0.19$ | 1.79 | 47 |

* * * * *